United States Patent Office 2,935,505
Patented May 3, 1960

2,935,505
PROCESS FOR PREPARING SALTS OF HYDROCARBON PHOSPHORUS SULFIDE REACTION PRODUCTS

Roger G. Lacoste, Glenham, Jackson W. Wisner, Wappingers Falls, and Herman D. Kluge, Fishkill, N.Y., assignors to Texaco Inc., a corporation of Delaware No Drawing. Application July 25, 1958
Serial No. 750,873

11 Claims. (Cl. 260—139)

This invention relates to a novel lubricant additive and a method of preparing the same. More particularly this invention involves an improved process whereby a highly over-based lubricant additive consisting of a metal salt of a phosphorus sulfide hydrocarbon reaction product is obtained.

Metal-containing neutralized reaction products of a phosphorus sulfide and a hydrocarbon are known to be effective additives in the formulation of lubricants for internal combustion engines. The use of neutralized phosphorus sulfide-hydrocarbon reaction products in lubricant compositions is disclosed in U.S. Patents 2,316,080 and 2,316,082, which issued April 6, 1943, to C. M. Loane et al. Recently it has become important to increase the basicity of these metal-phosphorus sulfide-hydrocarbon reaction products to improve their detergency and their effectiveness in neutralizing acidic compounds resulting from fuel combustion. A high degree of basicity is particularly desirable in low temperature operation wherein there is strong likelihood of acidic combustion products being absorbed by the lubricant rather than being discharged from the engine via the exhaust system.

A recent U.S. Patent 2,806,022, which issued September 10, 1957, to A. R. Sabol discloses a process for producing basic metal-phosphorus sulfide-hydrocarbon reaction product by effecting neutralization of a phosphorus sulfide-hydrocarbon reaction product with a prescribed amount of basic metal compound and in the presence of prescribed amounts of water and $C_1$ to $C_3$ alkyl alcohols. The present invention involves a process whereby more highly over-based metal-phosphorus sulfide-hydrocarbon reaction products are produced.

In accordance with the process of the invention, a phosphorus sulfide-hydrocarbon reaction product is neutralized with an alkaline earth metal basic compound in the presence of water and an ether alcohol boiling below 250° C. The neutralization is effected at a temperature between 100 and 250° C. and usually in an inert atmosphere. After removal of the water-ether alcohol solvent mixture, the reaction mixture is treated with steam at a temperature between 100 and 220° C. to eliminate gelling tendencies in the over-based alkaline earth metal-hydrocarbon-phosphorus sulfide reaction product by hydrolyzing the alkaline earth metal ether alcoholate present in the reaction mixture. After drying the reaction product, filtration yields a clear filterable over-based metal-hydrocarbon-phosphorus sulfide product containing more than 2 mol equivalents of metal per mole equivalent phosphorus sulfide-hydrocarbon reaction product.

As used hereafter in the description of the invention, normal alkaline earth metal hydrocarbon-$P_2S_5$ products designate a material containing 1 atom of metal per atom of phosphorus per mol of hydrocarbon reactant. Basic alkaline earth metal hydrocarbon-$P_2S_5$ products are compounds containing 2 atoms of metal per atom of phosphorus per mol of hydrocarbon reactant. Over-based alkaline earth metal hydrocarbon-$P_2S_5$ reaction products contain more than 2 atoms of alkaline earth metal per atom of phosphorus per mol of hydrocarbon reactant; the over-based salts prepared in this invention usually contain 3 to 4 atoms of alkaline earth metal per atom of phosphorus per mol of hydrocarbon reactant.

Although the exact course of the series of reactions involving hydrocarbon-$P_2S_5$ reaction, hydrolysis of the hydrocarbon-$P_2S_5$ reaction product and neutralization of the hydrolyzed product after removal of inorganic phosphorus acidic compounds is not known, it has been postulated that the salt obtained by neutralization of the hydrolyzed hydrocarbon-$P_2S_5$ reaction product has the following formula:

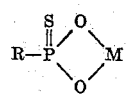

wherein R denotes the hydrocarbon radical and M denotes an alkaline earth metal. Employing the above terminology and using the barium salt by way of example, the composition of the normal, basic and over-based salts are shown hereafter. The following tabulation also shows the product resulting from $CO_2$ blowing of the basic and over-based salts to reduce their excess alkalinity.

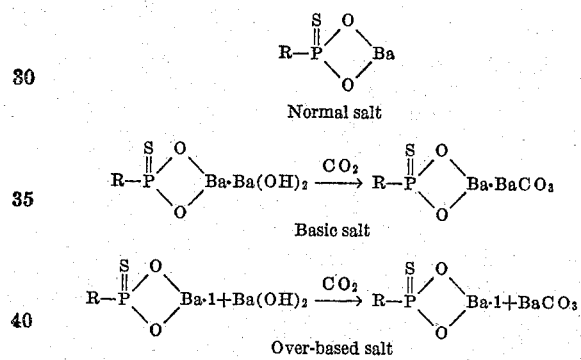

As disclosed in the afore-identified Loane et al. patent, the hydrocarbon reacted with the phosphorus sulfide may be either an aromatic hydrocarbon, a cycloaliphatic hydrocarbon or an aliphatic hydrocarbon. Aliphatic-substituted aryl compounds, aryl-substituted cycloaliphatic compounds and aryl-substituted aliphatic compounds are also usable as a hydrocarbon reactant with phosphorus sulfide to form reaction products, which on neutralization, yield metal salts useful as lubricating oil additives. Olefins, however, are by far the preferred reagents for reaction with phosphorus sulfides.

The olefinic hydrocarbon reacted with phosphorus sulfides usually contain at least 12 carbon atoms although lower molecular weight olefins can be employed. Monoolefin polymers such as isobutylene polymer, butylene polymer, propylene polymer, and co-polymers of monoolefins such as propylene-isobutylene copolymer are particularly preferred materials for reaction with phosphorus sulfides. In general, monoolefin polymers and copolymers having an average molecular weight between about 400 and 5000 are employed as the hydrocarbon reactant with polymers and copolymers having an average molecular weight in the range from about 600 to 2000 being particularly preferred. Copolymers of conjugated dienes and monolefins such as a copolymer of butadiene and isobutylene having an average molecular weight in the above-prescribed range are also reacted with phosphorus sulfides to give lubricant additives.

Olefins useful for reaction with phosphorus sulfides can also be prepared by halogenation of high molecular weight hydrocarbon fractions and subsequent dehydrohalogenation. Olefin fractions obtained by cracking of high molecular weight hydrocarbon fractions may also be used as the hydrocarbon reactant.

Although phosphorus sulfides such as $P_4S_5$, $P_4S_7$ and $P_4S_3$ may be used as the phosphorus sulfide reactant, phosphorus pentasulfide, $P_2S_5$, is used in substantially all commercial preparations because of its availability and cost. In subsequent description, $P_2S_5$ will be used to illustrate the invention process.

The olefin-$P_2S_5$ reaction product obtained by reacting about 5 to about 40 percent phosphorus sulfide with olefin at a temperature of from about 100–320° C. in a non-oxidizing atmosphere, for example, under a blanket of nitrogen, is usually hydrolyzed at a temperature between about 100 and 260° C. by contact with steam. Steam treatment is believed to hydrolyze the olefin-$P_2S_5$ reaction product to an organic phosphorus- and sulfur-containing acidic reaction product and inorganic phosphorus acids. The inorganic phosphorus acids may be removed by contact with an alkaline adsorbent clay such as disclosed in the Watson Patent 2,688,612, which issued September 7, 1954, but are advantageously removed by contact with a synthetic hydrous alkaline earth metal or magnesium silicate as disclosed in our commonly assigned copending application, Serial No. 750,874, filed of even date. The process of the copending application involves hydrolysis of the $P_2S_5$-olefin product with steam at a temperature between about 200 and 500° F. in the presence of synthetic hydrous magnesium, calcium or barium silicate.

The hydrolysis and alkaline adsorbent treatment of the $P_2S_5$ hydrocarbon reaction product are not essential to the process of the invention since it is found that a highly over-based alkaline earth metal hydrocarbon-$P_2S_5$ product is obtained regardless of whether the phosphorus sulfide hydrocarbon reaction product is subjected to separate hydrolysis and adsorbent treating steps or not. It has been found, however, that it is advantageous to subject the hydrocarbon-$P_2S_5$ product to hydrolysis and alkaline adsorbent contact since a product of better quality from the standpoint of engine wear and effectiveness is obtained thereby.

The ether alcohol employed in the neutralization of the phosphorus sulfide hydrocarbon reaction product with an alkaline earth metal basic compound has the general formula $R'O(RO)_nH$ wherein R is a divalent hydrocarbon aliphatic radical containing 2–3 carbon atoms, R' is the phenyl radical or a monovalent aliphatic hydrocarbon radical containing 1–5 carbon atoms and $n$ has a value of 1–2. The ether alcohol has a maximum boiling point of 250° C. Ether alcohols boiling above this temperature are difficult to separate from the reaction mixture which uses a mineral lubricating oil as a carrier both for the olefin-$P_2S_5$ product and the salt formed by the process of this invention. Examples of ether alcohols employed in the process of the invention are methyl Cellosolve, ethyl Cellosolve, n-propyl Cellosolve, isopropyl Cellosolve, butyl Cellosolve, isobutyl Cellosolve, amyl Cellosolve, phenyl Cellosolve, methyl Carbitol, ethyl Carbitol, butyl Carbitol, 2-methoxy-n-propanol, 2-ethoxy-n-propanol, 1-methoxy 2-hydroxy propane, and 1-ethoxy 2-hydroxy propane. Methyl and ethyl Cellosolves and methyl and ethyl Carbitols are preferred ether alcohols on the basis of cost and availability.

The ether alcohols are employed in the neutralization reaction mixture in an amount of about 3 to 30 mols per mol of inorganic alkaline earth basic metal compound employed in the neutralization. The preferred concentration is between 5 and 15 mols of ether alcohol per mol of inorganic alkaline earth basic metal compound.

The alkaline earth basic metal compound employed in the neutralization is usually an alkaline earth metal oxide, an alkaline earth metal hydroxide or alkaline earth metal carbonate. Alkaline earth metal hydroxides and oxides, specifically barium oxide, barium hydroxide, calcium oxide and calcium hydroxide are the preferred basic compounds.

In the process of the invention for preparing over-based alkaline earth metal salts, the alkaline earth metal basic compound is employed in a concentration between 3 and 5 mols of alkaline earth metal basic compound per mol of the olefin-$P_2S_5$ addition product. The molar concentration of the olefin-$P_2S_5$ addition product is readily determined from its neutralization number after the removal of inorganic phosphorus acids with an alkaline adsorbent basis the assumption that the hydrolyzed olefin-$P_2S_5$ product has the general formula:

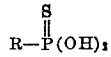

$$R-\overset{S}{\underset{\parallel}{P}}(OH)_2$$

wherein R denotes the hydrocarbon radical.

Water is also usually added to the neutralization reaction mixture to expedite the neutralization. The concentration of water employed is between 1 and 25 and usually 2 to 20 mols per mol of alkaline earth metal basic compound. Larger amounts of water may be used but such use only makes water separation from the product more time and energy consuming. The presence of water assures the conversion of at least a portion of the alkaline earth basic metal compound to the hydroxide which is the most active of the alkaline earth basic metal compounds in neutralizing hydrolyzed olefin-$P_2S_5$ products. The presence of water also assures the hydrolysis of the olefin $P_2S_5$ if a separate hydrolysis step has not been employed. If barium hydroxide or calcium hydroxide are employed as the neutralization reagents, the presence of water can be dispensed with although its use is recommended in order to obtain a faster neutralization reaction.

The neutralization of the olefin-$P_2S_5$ product with the alkaline earth metal basic compound in the presence of water and ether alcohol is effected under reflux which assures a reaction temperature between about 100 and 250° C. After neutralization is complete, which requires no more than approximately one hour, the water and ether alcohol solvents are removed by distillation.

After removal of water and ether alcohol, the reaction mixture is contacted with steam at a temperature between about 105 and 200° C. for a short period to convert any alkaline earth metal ether alcoholate formed in the neutralization reaction to metal hydroxide and ether alcohol which latter is removed with effluent steam. This steam treatment eliminates the gel-forming tendency of the lubricating oil concentrate of alkaline earth metal salt of the olefin-$P_2S_5$ product. This gel-forming tendency is apparently associated with the presence of alkaline earth metal salt of the ether alcohol solvent.

After the steam blowing, the reaction product is dried to give a product containing 3 to 4 mol equivalents of barium to mol of olefin-$P_2S_5$ product. If the product is dried without $CO_2$ blowing, the excess alkaline earth metal is in the form of dispersed alkaline earth metal hydroxide. The product is normally blown with $CO_2$ at a temperature between 100 and 200° C. which dries the product after the steam treatment and converts the dispersed barium hydroxide to barium carbonate.

Filtration of the over-based alkaline earth metal-hydrocarbon-$P_2S_5$ reaction product yields a clear, stable product. The filtered over-based alkaline earth metal-hydrocarbon-$P_2S_5$ product is usually in the form of a lubricating oil concentrate wherein the over-based metal salt constitutes 5–35 weight percent of the total concentrate. This lubricating oil concentrate is ready for use in the manufacture of finished lubricants.

The process of the invention is shown in the following examples. Examples 1–3 compare water-methyl Cellosolve, water-methyl alcohol and water alone as solvent media for the neutralization of olefin-$P_2S_5$ acid with excess base to prepare over-based products.

An olefin-$P_2S_5$ product was prepared by reacting polybutylene having an average molecular weight of about 700 with $P_2S_5$ in a mol ratio of 2 mols of olefin to 1 mol of $P_2S_5$ and sulfur in an amount equivalent to about 0.5 weight percent of the polybutylene. After addition of paraffin mineral oil in an amount equivalent to twice the weight of the polybutylene, the concentrate was hydrolyzed by steaming and inorganic phosphorus acids were separated by contact with synthetic hydrous magnesium silicate as described in our afore-identified copending application filed of even date. Portions of the resulting olefin-$P_2S_5$ acid concentrate were neutralized in the presence of three different solvent media as follows:

EXAMPLE 1

*Neutralization in a water-methyl Cellosolve solvent*

To a portion of the above acid concentrate there was added 2.46 mols of barium oxide per mol of acid and 15 mols of water per mol of barium oxide and the reaction mixture refluxed one hour. Methyl Cellosolve in an amount equivalent to 22 mols per mol of barium oxide was then added and the temperature increased to 325° F. while removing the solvent by distillation. The product was then steamed for one hour, blown with $CO_2$ until neutral and filtered.

EXAMPLE 2

*Neutralization in a water-methanol solvent*

To another portion of the acid concentrate, barium oxide and water were added in the same mol proportions employed in Example 1. After the reaction mixture was refluxed one hour, methanol in an amount equivalent to 42 mols of methanol per mol of barium oxide was added and the temperature increased to 325° F. while removing the solvent. At this temperature the product was steamed for one hour, blown with $CO_2$ until neutral and filtered.

EXAMPLE 3

*Neutralization in water as solvent*

To another portion of the acid concentrate, barium oxide in the same mol proportion used in Example 1 and water in an amount equivalent to 190 mols per mol of barium oxide were added. After refluxing for one hour, the temperature was raised to remove the solvent. The product was blown neutral with $CO_2$ and filtered.

In Table I there are shown the results of analysis of the barium and $CO_2$ contents of the barium-olefin-$P_2S_5$ salts prepared by the above three examples. The table also shows the theoretical barium and $CO_2$ contents of the product if all of the barium charged to the neutralization action were incorporated in the barium-olefin-$P_2S_5$ salt.

TABLE I

[Barium and $CO_2$ contents of barium-olefin-$P_2S_5$ salts, weight percent]

| | Theory | Found | | |
| --- | --- | --- | --- | --- |
| | | Example 1—$H_2O$-Methyl Cellosolve | Example 2—$H_2O$-MeOH | Example 3—Water |
| Percent Barium | 7.15 | 6.83 | 4.79 | 4.36 |
| Percent $CO_2$ | 1.36 | 1.18 | 0.45 | 0.30 |

The above results prove conclusively that a much higher degree of over-basing is obtained using the process of the invention wherein neutralization is effected in the presence of water and an ether alcohol than by the prior art processes wherein neutralization is effected in the presence of water alone or in the presence of a water-alcohol mixture. The product obtained in Example 1 employed a mixture of water and methyl Cellosolve as a neutralization medium is approximately a 30 percent over-based basic salt. It is interesting to note that the found barium content closely approximates the theoretical barium content attainable. In contrast, the products produced employing the water-methanol solvent and water alone as solvent media possess a much lower degree of over-basing than the product obtained in Example 1. As a matter of fact, the products obtained in Examples 2 and 3 apparently are normal barium-olefin-$P_2S_5$ salts in which theoretical barium content for above products is about 4.5 percent.

The production of an over-based barium-olefin-$P_2S_5$ salt employing the process of the invention and an olefin-$P_2S_5$ acid formed by reacting one mol of olefin with one mol of $P_2S_5$ is shown in Example 4.

EXAMPLE 4

1 mol of $P_2S_5$, 1.1 mols of polybutylene having an average molecular weight of about 700, and sulfur in an amount equivalent to about 0.5 weight percent of the polybutylene were reacted at 450° F. for four hours in a nitrogen atmosphere. The reaction product was diluted with a weight equal to twice that of the polybutylene of a paraffin base distillate oil having an SUS at 100° F. of about 100. The concentrate was steamed at 375° F. for four hours in a nitrogen atmosphere then dried to give a product having a neut. No. of 56.3.

The acid was then treated with synthetic hydrous calcium silicate in a dosage of about 10 weight percent of the steamed acid at a temperature of about 150° C. for a period of one hour under a nitrogen atmosphere. On filtration there was obtained a clear concentrate having a neut. No. of 18.2 and an ASTM diluted color of 2½ —. To 1 mol of the adsorbent treated product (2,440 gms.) there were added 3.2 mols of barium oxide and 16.3 mols of water. The reaction mixture was refluxed for ½ hour, 24.4 mols of methyl Cellosolve added and the temperature of the reaction mixture raised to 325° F. On reaching about 163° C. the reaction mixture was steamed ½ hour followed by $CO_2$ blowing until dry. The product obtained on filtration was an over-based barium salt of an olefin-$P_2S_5$ reaction product having a barium content of 14.5 weight percent (theoretical barium for product having 4 mols of barium per mol of hydrolyzed olefin-$P_2S_5$ product is 14.8%). This product had an ASTM diluted color of about 4 and was a clear solution having a wine red color.

An over-based barium-olefin-$P_2S_5$ product produced by the process of the invention and having a barium content of about 11.8 percent and a phosphorus content of about 0.9 percent was evaluated as a detergent in a 10W–30 oil containing a balanced additive formulation in a CLR light duty deposits test. In this test the engine was assembled in accordance with the CRC L–38 procedure except that the compression ring gaps are enlarged to 0.070 inch, the external oil heater is removed and cooling is provided for the rocker arm cover and the crankcase oil pan. The following operating conditions are maintained during the operation of the engine: Engine speed, 1500 r.p.m.; fuel-air ratio, 0.071; spark advance, 20° BTC; gallery oil pressure, 17.5 p.s.i.g.; mixture temperature 100° F.; crankcase gauge pressure, 0; indicated HP, 8.5. The jacket-out temperature is cycled between 110 and 190° F., these temperatures being maintained for 6 and 2 hours respectively, giving a total cycle time of 8 hours. During the cold portion of the cycle, cooling water is circulated through the jacketed rocker arm cover and oil pan. The total run duration may vary from 50 to 110 hours dependent on the fuel-oil combination used. The engine deposits are rated visually on a merit basis using essentially the CLR deposit rating scale.

In the above-described test, the 10W–30 oil comprising a highly refined paraffin base distillate oil, a polymethacrylate VI improver (Acryloid 618), a barium $C_{12}$ alkyl phenolate and zinc isopropyl methylisobutylcarbinyl dithiophosphate gave outstanding results indicating the effectiveness of over-based basic barium-olefin-$P_2S_5$ products produced by the process of the invention in low temperature operation.

Obviously, many modifications and variations of the invention as hereinbefore set forth may be made without departing from the spirit and scope thereof and, therefore, only such limitations should be imposed as are indicated in the appended claims.

We claim:

1. A process for preparing over-based alkaline earth metal salts of phosphorus sulfide-olefinic hydrocarbon reaction products which comprises reacting phosphorus sulfide with a hydrocarbon, neutralizing the resulting reaction product with a basic alkaline earth metal inorganic compound in the presence of water and an ether alcohol having a boiling point below 250° C. and the general formula: $R'O(RO)_nH$ wherein R is a divalent aliphatic hydrocarbon radical containing 2 to 3 carbon atoms, R' is selected from the group consisting of a phenyl radical and an aliphatic hydrocarbon radical containing 1 to 5 carbon atoms and $n$ has a value of 1–2.

2. A process according to claim 1 in which said olefinic hydrocarbon is reacted with $P_2S_5$.

3. A process for preparing over-based alkaline earth metal salts of phosphorus sulfide-olefinic hydrocarbon reaction products which comprises reacting phosphorus sulfide with an olefin, neutralizing the resulting reaction product with a basic alkaline earth metal inorganic compound selected from the group consisting of oxides, hydroxides, carbonates, and mixtures thereof in the presence of water and an ether alcohol having a boiling point below 250° C. and the general formula: $R'O(RO)_nH$ wherein R is a divalent aliphatic hydrocarbon radical containing 2 to 3 carbon atoms, R' is selected from the group consisting of a phenyl radical and an aliphatic hydrocarbon radical containing 1 to 5 carbon atoms and $n$ has a value of 1–2, removing water and ether alcohol from the neutralization reaction mixture and steam blowing the neutralized mixture.

4. A process according to claim 3 in which said olefinic hydrocarbon phosphorus sulfide reaction product is dissolved in a mineral lubricating oil prior to reaction with said alkaline earth metal basic compound.

5. A process according to claim 3 in which said alkaline earth metal is barium.

6. A process according to claim 3 in which water is present during the neutralization reaction in an amount equivalent to 1–30 mols of water per mol of said alkaline earth metal compound and said ether alcohol is present in an amount between 3 and 30 mols of ether alcohol per mol of said alkaline earth metal compound.

7. A process for preparing over-based alkaline earth metal salts of $P_2S_5$-olefin polymer reaction products which comprises reacting $P_2S_5$ with an olefin polymer, adding lubricating oil to form a concentrate of the resulting $P_2S_5$-olefin polymer product, neutralizing the said concentrate with a basic alkaline earth metal inorganic compound selected from the group consisting of oxides, hydroxides, carbonates, and mixtures thereof in the presence of water and an ether alcohol having a boiling point below 250° C. and the general formula: $R'O(RO)_nH$ wherein R is a divalent aliphatic hydrocarbon radical containing 2–3 carbon atoms, R' is selected from the group consisting of a phenyl radical and an aliphatic hydrocarbon radical containing 1–5 carbon atoms and $n$ has a value of 1–2, removing water and ether alcohol from the neutralization reaction mixture, steam blowing said reaction mixture at a temperature between 100 and 200° C., blowing said reaction mixture with $CO_2$ at a temperature between 100 and 200° C. and filtering the reaction mixture to give a clear concentrate of an over-based alkaline earth metal salt of $P_2S_5$-olefin polymer reaction product.

8. A process according to claim 7 in which said alkaline earth metal compound is barium.

9. A process according to claim 7 in which said ether alcohol is methyl Cellosolve.

10. A process according to claim 7 in which water is used in an amount equal to 1–30 mols of water per mol of said alkaline earth metal compound and said ether alcohol is used in an amount equivalent to 3–30 mols per mol of said alkaline earth metal compound.

11. A process for preparing over-based alkaline earth metal salts of olefin polymer-phosphorus sulfide reaction products which comprises reacting an olefin polymer and phosphorus sulfide at a temperature above about 100° C., hydrolyzing the phosphorus sulfide-olefin polymer reaction product in a lubricating oil medium by contact with steam, separating inorganic phosphorus acids from the hydrolyzed reaection product by contact with an alkaline adsorbent, reacting the adsorbent-treated product with an alkaline earth metal basic inorganic compound selected from the group consisting of oxides, hydroxides, carbonates, and mixtures thereof in the presence of water and an ether alcohol having a boiling point above 250° C. and the general formula: $R'O(RO)_nH$ wherein R is a divalent aliphatic hydrocarbon radical containing 2 to 3 carbon atoms, R' is selected from the group consisting of a phenyl radical and an aliphatic hydrocarbon radical containing 1 to 5 carbon atoms and $n$ has a value of 1–2, removing water and ether alcohol from the reaction mixture, steam blowing said mixture, $CO_2$ blowing said mixture and filtering to give a clear concentrate of said over-based alkaline earth metal salt of phosphorus sulfide-olefin polymer reaction product.

References Cited in the file of this patent

UNITED STATES PATENTS

| | | |
|---|---|---|
| 2,727,030 | Beretvas | Dec. 13, 1955 |
| 2,851,416 | Sabol et al. | Sept. 9, 1958 |